T. H. BELL AND J. G. SCHOENLEBER.
WINDOW CLOSURE DEVICE.
APPLICATION FILED FEB. 11, 1920.
1,356,123.
Patented Oct. 19, 1920.
FIG. 1.
FIG. 2.
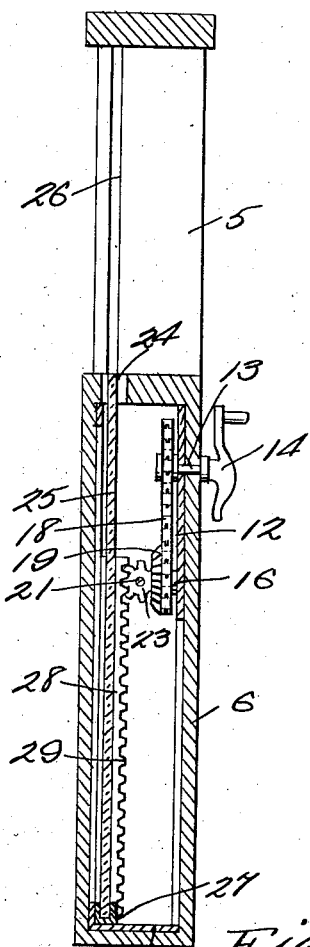
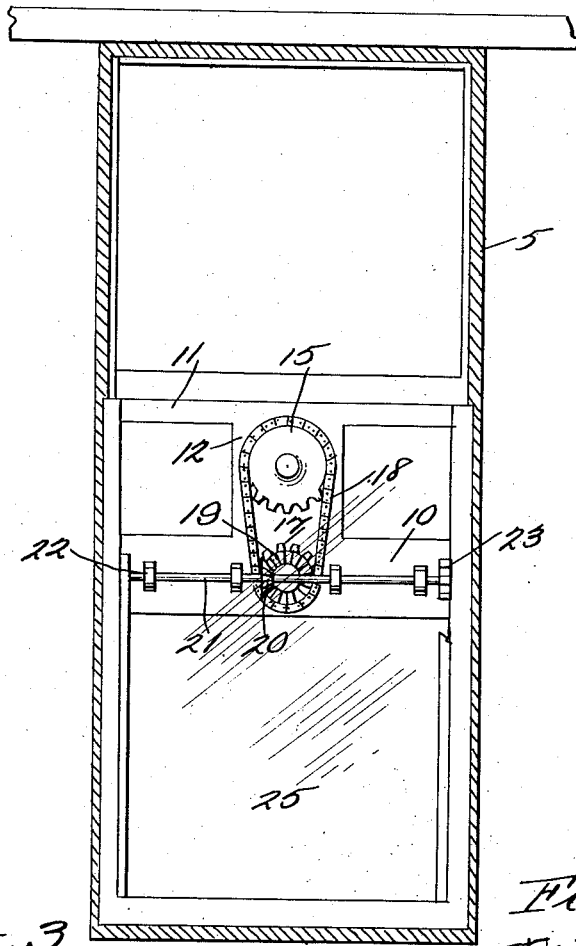
FIG. 3.
FIG. 4.
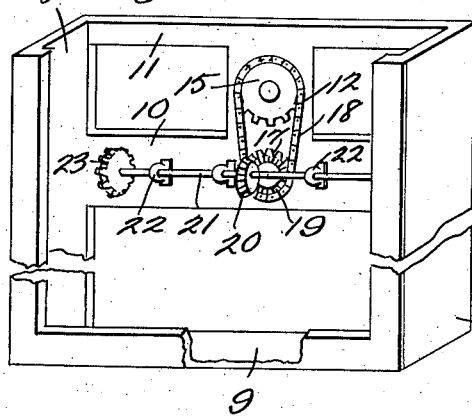
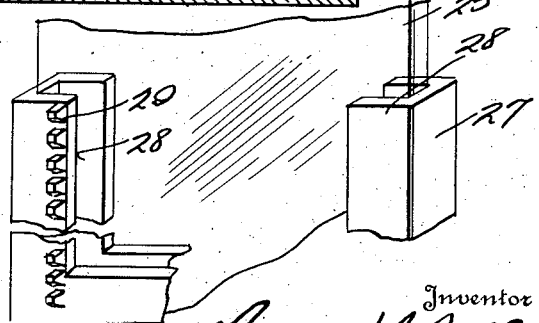
Inventor
Thomas H. Bell.
John G. Schoenleber.

UNITED STATES PATENT OFFICE.

THOMAS H. BELL AND JOHN G. SCHOENLEBER, OF NEW YORK, N. Y.

WINDOW-CLOSURE DEVICE.

1,356,123.

Specification of Letters Patent.

Patented Oct. 19, 1920.

Application filed February 11, 1920. Serial No. 357,783.

*To all whom it may concern:*

Be it known that we, THOMAS H. BELL and JOHN G. SCHOENLEBER, citizens of the United States, residing at New York, in the county of New York and State of New York, have invented certain new and useful Improvements in Window-Closure Devices, of which the following is a specification.

Our invention relates to improvements in a window closure device and more particularly to a means for raising and lowering windows forming a part of automobiles, which will be under the control of the occupants within the vehicle permitting ready adjustment of the window, as desired.

The primary object of the invention resides in the novel and simple arrangement of the various parts, which may be easily installed upon an automobile door of the conventional type, without materially altering its structure.

A further object of the invention lies in the provision of a mechanism of the above mentioned character which is efficient and reliable in operation, durable in construction and inexpensive to manufacture.

Other objects and advantages of the invention will be apparent during the course of the following description.

In the accompanying drawings forming a part of this specification and in which like numerals are employed to designate like parts throughout the same, Figure 1 is a transverse vertical sectional view through an automobile door having the device embodying our invention applied thereto;

Fig. 2 is a front vertical sectional view of an automobile door showing in detail the mechanism of our improved device;

Fig. 3 is a fragmentary perspective view of the casing supporting our mechanism which is placed within the structure of the door, and Fig. 4 is a fragmentary perspective view of the window pane employed in connection with our device showing in detail the structure thereof.

In the drawings, wherein for the purpose of illustration we have shown a preferred embodiment of our invention, the numeral 5 indicates as a whole the door of an automobile, such as is commonly used in connection with automobile bodies of the limousine type. This door comprises a lower portion 6 which in this instance is of hollow construction to provide a chamber for the reception of our improved mechanism. Disposed within the chamber is a substantially U-shaped metal frame having channeled sides 8, and a channeled end 9. The sides of the frame are braced by the horizontal strips 10 and 11 which extend across the frame and are joined together by the central vertical strip 12. A shaft 13 is journaled through the inner side of the upper end of the casing and the vertical strip 12, having a crank 14 attached to the end projecting without the casing, and a sprocket wheel 15, fixedly secured to its opposite end within the casing. A short shaft 16 projects outwardly within the casing from the strip 10 to which it is attached, directly beneath the sprocket wheel 15 and has journaled to its outer end a second sprocket wheel 17 of smaller diameter than the first mentioned sprocket wheel. An endless roller chain 18 connects the two sprocket wheels, and through this medium the motion imparted to the sprocket wheel 15 by the turning of the crank 14 will be transmitted to the sprocket wheel 17. The outer face of the sprocket wheel 17 has formed integral therewith a bevel-gear 19 which meshes with the bevel-gear 20 disposed at right angles thereto and mounted rigidly upon the horizontally disposed shaft 21 approximately midway its length. The shaft 21 extends for approximately the entire width of the frame 7 being mounted in bearings 22 which project outwardly from the strip 10 to which they are attached. Each end of the shaft 21 is provided with a spur gear 23, the purpose of which will be set forth hereinafter.

The upper end of the chamber 6 is provided with a horizontal slot 24 which is adapted to receive therein a glass panel 25 which extends into the interior of the chamber, as clearly shown in Fig. 1. The upper portion of the door 5 is provided along its sides with vertical slots 26 to receive and guide the movement of the glass panel when elevated. The lower portion of the glass panel 25 is surrounded by a metal reinforcing strip 27 having inwardly directed flanges 28 by which the strip is securely affixed to the panel. The front sides of the inner flanges are provided with ratchet teeth 29, whereby said flanges serve as a rack-bar. The length of the rack-bar will vary according to the height to which the glass panel is to be elevated, but ordinarily will only extend along the side of the panel for approximately one-half its length. These rack-bars mesh with the spur gear 23 through which medium the glass panel is adjusted.

In use, the operation is as follows: Should it be desired to elevate the glass panel from the position, as shown in Fig. 1 to a closed position, the handle 14 is turned, thereby imparting rotary motion to the sprocket wheel 15 which motion is transmitted to the sprocket wheel 17, through the medium of the endless roller chain 18. The sprocket wheel 19 has a bevel-gear formed integral therewith, which meshes with the bevel-gear 20, through the medium of which power is imparted to the shaft 21 having the spur gears 23 attached to each of its ends. The spur gears 23 meshing with the rack-bar 29 will elevate the panel 25, thereby totally or partially closing the opening at the upper end of the door 5. To lower the panel the crank 14 is turned in the opposite direction, thus reversing the motion of the various sprocket and gear wheels which will allow the panel to descend easily and quickly. Thus it is obvious that by employing the device embodying our invention in connection with automobiles of the limousine type, very little difficulty is experienced in the raising and lowering of the glass panels, so as to properly regulate the ventilation as desired by the occupants of the vehicle.

It is to be understood that the form of our invention herewith shown and described is to be taken as a preferred example of the same, and that certain changes in the shape, size, and arrangement of parts may be resorted to without departing from the spirit of the invention or the scope of the subjoined claims.

Having thus fully described our invention, what we claim is:

1. In a closure device, a vertically movable panel, racks at each side of the panel, pinions meshing with the racks supported by a horizontally disposed shaft, a bevel-gear midway the length of the shaft, a second bevel-gear meshing with the first bevel-gear, a sprocket wheel formed integral with the second bevel-gear, a second sprocket wheel disposed above the first sprocket wheel, and a roller chain connecting the two sprocket wheels whereby motion is imparted to the horizontal shaft.

2. In a closure device, a vertically movable panel, a strip secured to and surrounding a portion of the panel, a frame within which the panel is telescopically received, racks extending along the sides of the strip, and a gear mechanism associated with the frame whereby the panel is raised or lowered.

3. In a closure device, a vertically movable panel, a strip secured to and surrounding a portion of the panel, a frame within which the panel is telescopically received, racks extending along the sides of the strip, pinions meshing with the racks supported by a horizontally disposed shaft, a bevel-gear midway the length of the shaft, a second bevel-gear meshing with the first bevel-gear, a sprocket wheel formed integral with the second bevel-gear, a second sprocket wheel disposed above the first sprocket wheel, and a roller chain connecting the two sprocket wheels whereby motion is imparted to the horizontal shaft.

In testimony whereof, we have affixed our signatures in the presence of two witnesses.

THOMAS H. BELL.
JOHN G. SCHOENLEBER

Witnesses:
MABEL T. APPLEBY,
NICHOLAS SCHMITT.